United States Patent [19]

Jones et al.

[11] 3,920,340

[45] Nov. 18, 1975

[54] CABLE CONNECTOR

[75] Inventors: Robert D. Jones; Jerry L. Hall, both of Oskaloosa, Iowa

[73] Assignee: Intraco, Inc., Oskaloosa, Iowa

[22] Filed: July 5, 1974

[21] Appl. No.: 485,977

[52] U.S. Cl. ............... 403/306; 403/308; 403/335; 403/362
[51] Int. Cl.² .......................................... F16B 7/18
[58] Field of Search .......... 403/300, 303, 304, 305, 403/306, 335, 336, 338, 362, 408, 58, 291, 135, 308; 285/388, 359, 386, 387

[56] References Cited
UNITED STATES PATENTS

| | | | |
|---|---|---|---|
| 2,438,107 | 3/1948 | Babbitt | 285/388 |
| 3,530,548 | 9/1970 | Gearin | 403/300 |

FOREIGN PATENTS OR APPLICATIONS

| | | | |
|---|---|---|---|
| 131,875 | 5/1929 | Switzerland | 403/338 |

Primary Examiner—Werner H. Schroeder
Assistant Examiner—Wayne L. Shedd
Attorney, Agent, or Firm—Henderson & Strom

[57] ABSTRACT

A connector for a cable conveyor system having a plurality of evenly spaced members disposed on a cable, the cable and evenly spaced members being adapted to be disposed in a cable conveyor tube. Internally threaded tubular sleeve members are disposed on each end of the cable and each tubular sleeve member has an enlarged end with a partially spherically shaped surface thereon. Internally threaded radial holes in the tubular sleeve members have set screws received therein, the ends of the set screws being in abutment with the cable to thereby hold the tubular sleeve members securely on the ends of the cable. A connector body member having a bore therein is disposed around one of the tubular members for abutment with the enlarged end thereof. A counterbore in the connector body member is co-axial with the bore of the connector body member and has a washer received therein for complementary abutment with the enlarged portion of the other tubular member. A snap ring is received in a groove in the counterbore for the purpose of holding the washer within the counterbore.

6 Claims, 5 Drawing Figures

U.S. Patent  Nov. 18, 1975  3,920,340
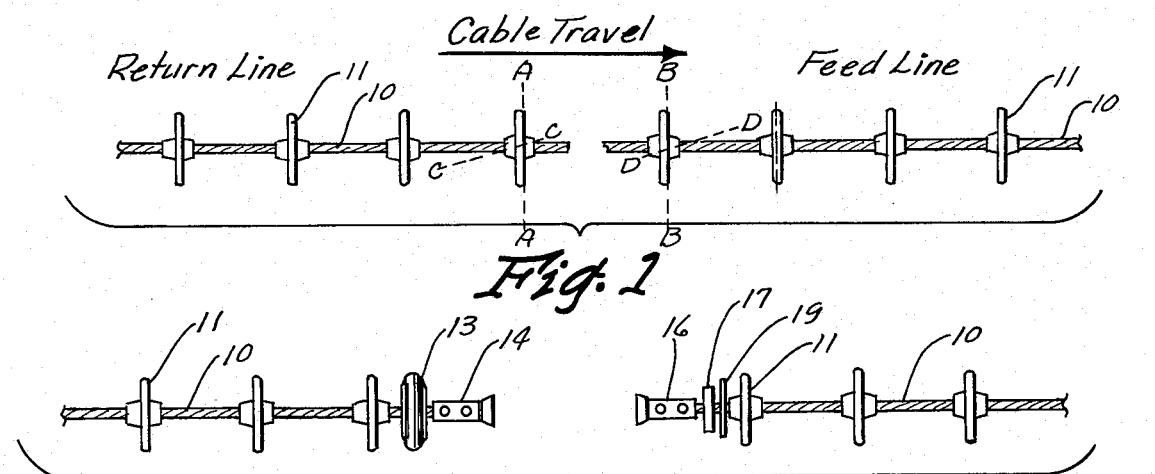
Fig. 1
Fig. 2
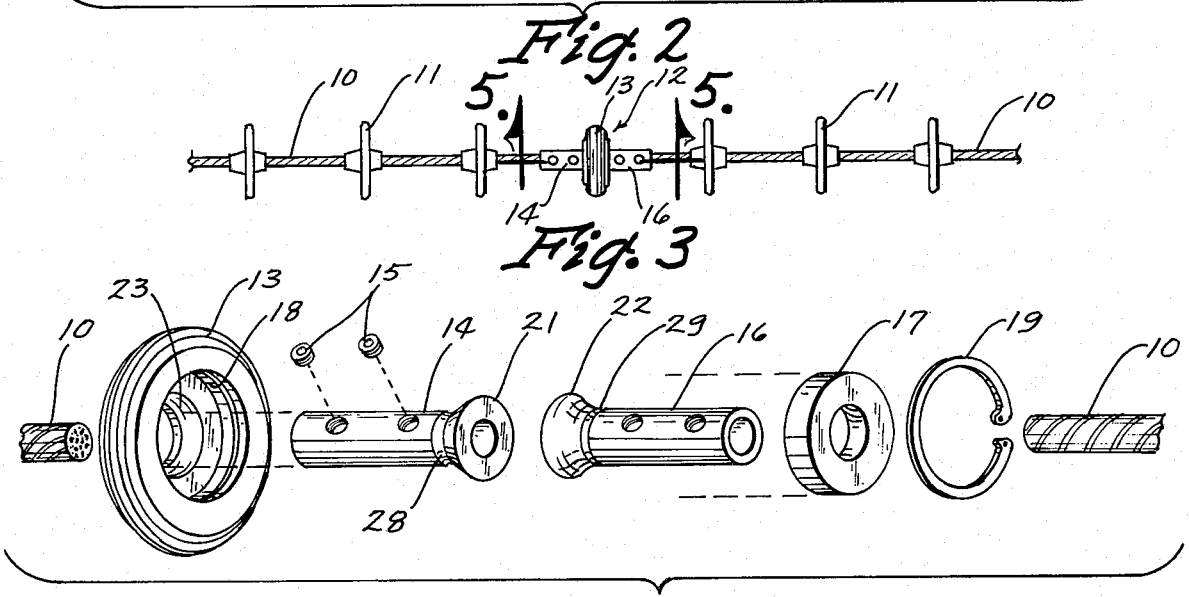
Fig. 3
Fig. 4
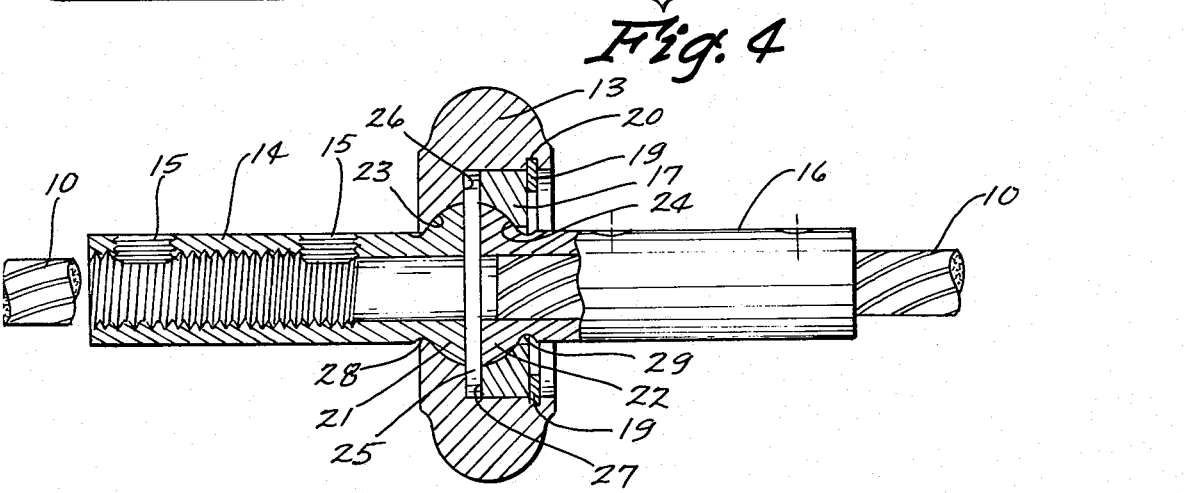
Fig. 5

3,920,340

CABLE CONNECTOR

BACKGROUND OF THE INVENTION

The present invention relates generally to cable connectors and more particularly to an improved cable connector for use in a cable conveying system.

In the materials handling field for materials which are granular or powdery in nature, a sub-field of cable conveyor technology has developed. Examples of cable conveyors of this general type may be seen in U.S. Pat. Nos. 2,940,424 and 3,586,155. These systems, in their simplest form, are comprised primarily of a tube which is connected together at its ends, a continuous cable disposed in the tube and having spaced inserts connected thereto for driving materials through the tube, a mechanism for moving the cable with the inserts thereon along the tube, and, material, supply and discharge ports associated with the tube. It is of a very common design to have each of the inserts of a cable conveyor form a joint between cable or rod sections such as shown in U.S. Pat. Nos. 2,794,421, 3,216,553 and 3,722,664. It has been found, however, that it is more economical and more reliable to mold the inserts to the cable and to have a single joint connecting the ends of the cable. This last mentioned general type of system is disclosed in co-pending applications, Ser. Nos. 434,768 and 443,229.

It can be seen from the various types of cable connectors disclosed in the above mentioned patents, that there does indeed exist a problem of how to connect cable ends in a cable conveyor system. This is true because it is imperative that the cable connector be reliable, and in addition it is desirable that the connection be economical both to manufacture and to install, as well as to be quick and simple to install without the requirement of extensive training of the personnel used to maintain these systems.

SUMMARY OF THE INVENTION

The present invention relates to a cable connector having tubular sleeve members secured to the ends of a cable, the tubular sleeve members having enlarged portions of a novel configuration on the ends thereof. A connector body member comprises the main component of the present invention and has a bore therein for receiving, surrounding and abutting the enlarged end of one of the tubular members. The connector body member also has a counterbore therein, in which is disposed a washer for surrounding and abutting the enlarged portion of the other tubular member. A groove in the counterbore has a snap ring therein to thereby serve as a means for holding the washer within the counterbore of a connector body member.

An object of the present invention is to provide a cable connector which is extremely reliable.

Another object of the invention is to provide a cable connector which is quick and simple to install.

Still another object of the present invention is to provide a cable connector which is economical to manufacture.

Other objects, advantages, and novel features of the present invention will become apparent from the following detailed description of the invention when considered in conjunction with the accompanying drawings.

BRIEF DESCRIPTION OF THE DRAWINGS

FIG. 1 is a view of a conveyor cable line in need of connection;

FIG. 2 is a view of the cable of FIG. 1 having the parts of the cable connectors in readiness to be connected;

FIG. 3 shows the cable connector in its assembled form;

FIG. 4 is an exploded view of the cable connector of the present invention; and

FIG. 5 is a partial cross-sectional view of the present invention taken along line 5—5 of FIG. 3.

DESCRIPTION OF THE PREFERRED EMBODIMENT

Referring now to the drawings wherein like reference numerals designate identical or corresponding parts throughout the several views, FIG. 1 shows the first step in installing the cable connector of the present invention. A cable 10 is shown in FIG. 1 with rigidly affixed and equally spaced nylon or plastic disc members 11 attached thereto. In order to connect the cable connector 12 (FIG. 3) to the cable 10 at the proper place, the cable and disc 11 is sawed completely through along line A—A of FIG. 1. A similar sawing through of the disc 11 and the cable 10 is effected along line B—B of FIG. 1. The ends of the cable 10 are then sawed again along lines C—C and D—D, and the remainder of the discs 11 are removed from the ends of the cable. The connector body member 13 is then slid onto the cable in the approximate position as shown in FIG. 2. The internally threaded tubular sleeve member 14 is then threadedly screwed onto the cable by turning the sleeve in a counterclockwise direction until the end of the sleeve is flush with or within 1/16 of an inch of the end of the cable at A—A. The two set screws 15 are then screwed into the tubular sleeve and tightened until the ends thereof are firmly in abutment with and squeezing down upon the cable 10. The ends of these set screws 15 are then filed off if they protrude, so that they will not bind between the drive sprocket teeth (not shown) as the connector 12 passes over the drive sprocket.

The washer 17 is then slid upon the cable in the approximate position shown in FIG. 2. The second tubular sleeve member 16 is then screwed onto the other end of the cable 10 until the tubular sleeve 16 is flush with or within 1/16 of an inch of the end of the cable along line B—B. The two set screws 15 which are associated with the tubular sleeve member 16 are then inserted in the manner referred to above with respect to tubular sleeve member 14, and the set screws 15 are then filed off as required. The two ends of the cable are then substantially covered by the tubular sleeve members 14 and 16 and the connection is made complete by bringing these two ends together and forcing the washer 17 into the counterbore 18 of the connector body member 13 and placing the snap ring 19 into the annular groove 20 as shown best in FIG. 5. The resultant connection is shown in FIGS. 3 and 5.

The enlarged portion 21 and 22 on the tubular sleeve members 14 and 16 respectively are somewhat partially spherical in shape and are complimentarily mating with the internal partially spherical surfaces 23, of the body member 13, and, 24, of the washer 17 respectively (FIG. 5). A space 25 is provided between the two enlarged ends 21 and 22 and between the end of the counterbore 26 of the connector body member 13 and the end 27 of the washer 17. This space 25 allows a greater flexibility in the joint such that the spherically mating surfaces may slide or move with respect to each other. Annular indentations 28 and 29 on the tubular sleeve members 14 and 16 respectively also facilitate this movement.

By following the above outlined procedures, the rear driving surfaces of the discs 11 are still equally spaced as is the rear, or left side, driving surface of the connector body 13 as shown in the drawings, such that the driving mechanism, as for example shown in co-pending Ser. No. 434,768, can readily drive the cable without sensing a difference between the connector joint 12 and an ordinary cable disc member 11.

Accordingly, it can be readily seen that all of the objects mentioned above are accomplished by using this embodiment of the present invention. However, obviously many modifications and variations of the present invention are possible in light of the above teachings. It is therefore to be understood that, within the scope of the appended claims, the invention may be practiced otherwise than as specifically described.

We claim:

1. A connector for a cable comprising:
   a first enlarged portion adapted to be connected to one end of a cable, said first enlarged portion having a partially spherical surface thereon;
   a second enlarged portion adapted to be connected to one end of a cable, said second enlarged portion have a partially spherical surface thereon;
   a connector body having a central bore therein, said connector body surrounding each enlarged portion and abutting said first enlarged portion, said connector body also having a counterbore therein, said central bore of said connector body having a partially spherical surface which is complimentary in shape to the shape of the partially spherical surface of the first enlarged portion;
   a washer disposed in said counterbore and abutting said second enlarged portion, said washer having a partially spherical surface which is complimentary to the partially spherical surface of said second enlarged portion; and
   means for holding said washer in said counterbore.

2. The cable connector as defined in claim 1 wherein said holding means comprises an annular groove in said counterbore having a snap ring disposed therein.

3. The cable connector as defined in claim 1 wherein said first and second enlarged portions have a partially spherical surface thereon;
   said central bore of said connector body having a partially spherical surface which is complimentary in shape to the shape of the partially spherical surface of the first enlarged portion; and
   said washer having a partially spherical surface which is complimentary to the partially spherical surface of said second enlarged portion.

4. A connector for a cable comprising:
   a first enlarged portion adapted to be connected to one end of a cable;
   a second enlarged portion adapted to be connected to one end of a cable;
   a connector body having a central bore therein, said connector body surrounding each enlarged portion and abutting said first enlarged portion, said connector body also having a counterbore therein;
   a washer disposed in said counterbore and abutting said second enlarged portion; and
   means for holding said washer in said counterbore;
   wherein each of said first and second enlarged portions is formed on the end of a tubular sleeve member, each of said tubular sleeve members being internally threaded and thereby adapted to be threadedly attached to the end of the cable, and
   wherein each of said tubular sleeve members has at least one threaded radial bore and a threaded set screw received in said radial bore with one end thereof in enagagement with said cable.

5. The cable connector as defined in claim 1 wherein said first and second enlarged portions are spaced from each other when the cable is under a tension force.

6. The cable connector as defined in claim 1 wherein each of said first and second enlarged portions is formed on the end of a tubular sleeve member, said tubular sleeve member being internally threaded and thereby adapted to be threadedly attached to the end of the cable, and
   wherein each of said tubular sleeve member has at least one threaded radial bore and a threaded set screw received in said radial bore with one end thereof in engagement with said cable.

* * * * *

Disclaimer 3,920,340.—*Robert D. Jones* and *Jerry L. Hall*, Oskaloosa, Iowa. CABLE CONNECTOR. Patent dated Nov. 18, 1975. Disclaimer filed Dec. 12, 1975, by the assignee, *Intraco, Inc.*

Hereby enters this disclaimer to claims 1, 2 and 3 of said patent.

[*Official Gazette February 10, 1976.*]